UNITED STATES PATENT OFFICE.

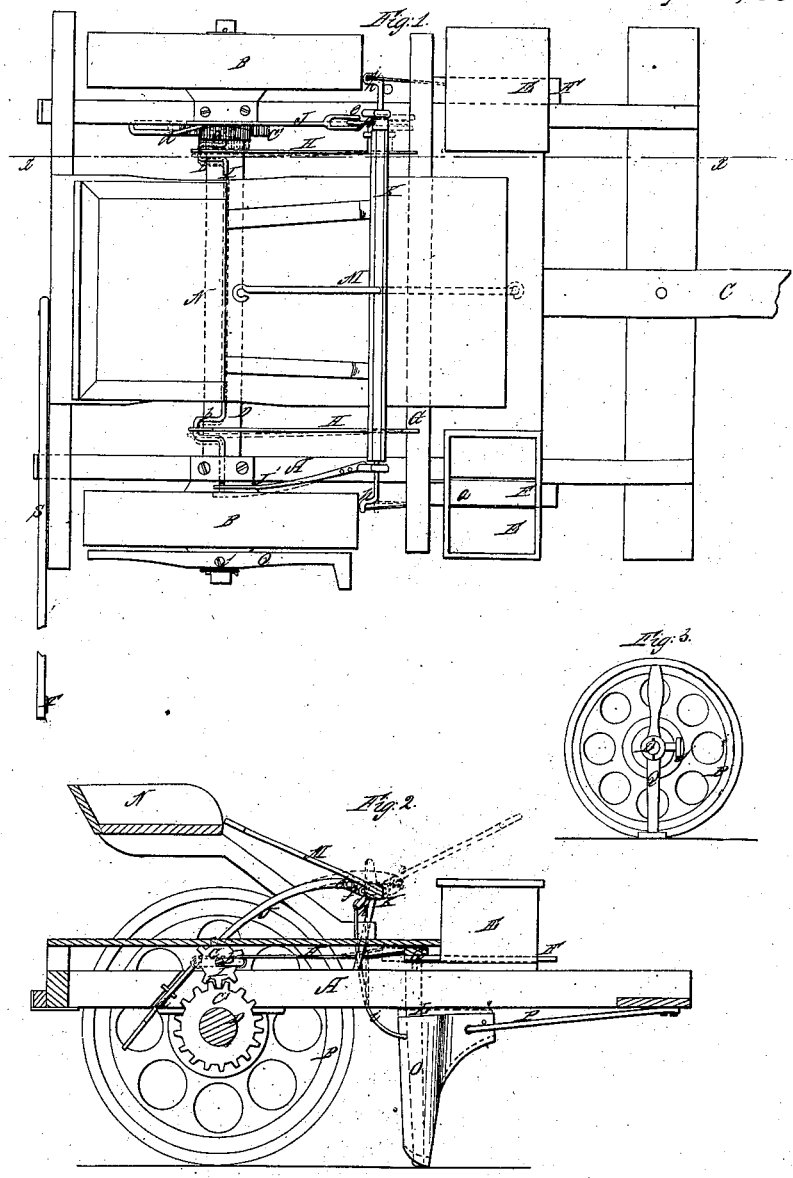

JOHN AGNEW, OF BATH, PENNSYLVANIA.

IMPROVEMENT IN CORN-PLANTERS.

Specification forming part of Letters Patent No. 42,151, dated April 5, 1864.

*To all whom it may concern:*

Be it known that I, JOHN AGNEW, of Bath, in the county of Northampton and State of Pennsylvania, have invented a new and Improved Seeding-Machine; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $xx$, Fig. 1; Fig. 3, a detached side view of the adjustable marking device.

Similar letters of reference indicate corresponding parts in the several figures.

This invention relates to a new and improved seed-planter of that class which are designed for planting seed in hills and in check-rows.

The invention consists in a novel and improved seed-dropping mechanism, with means for turning the same out of gear simultaneously with the elevating of the shoes or furrow-openers, as hereinafter described, whereby the seed-dropping device is placed under the complete control of the driver, and is capable of being manipulated by him when the machine is being drawn along.

The invention also consists in the employment or use of a marking device arranged and applied to one of the wheels of the machine, whereby the latter may always be started correctly at the commencement at each "bout" or movement across the field and the seed planted in check-rows, so that the plants may be plowed two ways at right angles to each other.

To enable those skilled in the art to fully understand and construct my invention, I will proceed to describe it.

A represents the frame of the machine, which may be of rectangular form, and is mounted upon two wheels, B B.

C is the draft-pole of the machine, and D the axle of the wheels B B, one of the wheels being permanently attached to the axle and the other placed loosely upon it. The wheels B B are nearer the back than the front part of the frame A, and upon the frame A in front of each wheel B there is placed a seed-box, E. At the bottom of each seed-box E there is a reciprocating seed-slide, F, each being perforated with a hole, $a$. These slides are parallel with the sides of the frame A, and they are connected at their back ends to a bar, G, which extends the whole width of the framing A, as shown in Fig. 1. The bar G is connected by two pitmen, H H, to cranks $b\ b$ on a shaft, I, which is placed in the frame A, directly above and parallel with the axle D, and said crank-shaft receives its motion from the axle through the medium of gears $c\ c'$. The shaft I is allowed to slide longitudinally in its bearings, and one end of said shaft has a spring, J', bearing against it, said spring keeping the wheel $c$ of shaft I in contact with a beveled projection, $d$, on a bar, J, the front end of which is connected by a joint, $e$, with an arm, $f$, on a shaft, K, on the frame A, the wheel $c$ being at the same time kept in gear with the wheel $c'$ on the axle D. By means of the crank-shaft I and pitmen H H a reciprocating motion is communicated to the slides F F, which distribute the seed in the same way as most of the reciprocating slides used on seeding-machines, the holes $a$ of the slides filling with seed when in the seed-boxes and when drawn out therefrom dropping it into seed-conveying tube L.

The shaft K has a lever, M, attached to it, which extends upward in front of the driver's seat N, and by shoving this lever forward the shaft K is turned and the bar J drawn forward, so that the beveled projection $d$ will act laterally against the wheel $c$ and throw it out of gear with the wheel $c'$ of the axle D, thereby stopping the seed-distributing device or rendering it inoperative. The ends of the shaft K have cranks $h$ attached, the ends of which are connected by rods $i\ i$ with shoes or furrow-openers O O, which encompass the seed-conveying tubes L and are connected to arms P, the front ends of which are attached to the front end of the frame A.

From the above description it will be seen that when the shaft K is turned to throw the crank-shaft I out of gear with the axle D the furrow-openers O will be simultaneously elevated free from the ground.

On one end of the axle D there is placed loosely a bar, Q, one end of which is provided with a flat plate or projection to make a mark on the ground at every revolution of the wheels B as the machine is drawn along. These marks indicate the droppings of the seed or where they are covered, and serve as guides to the driver in starting the machine at the commencement of each movement across the field. This bar Q is connected with the axle D, so as to turn with it, by means of a screw, *j*, and the bar is set at the commencement of each movement, so as to be in line with those previously made. By this means the seed will be planted in check-rows, so that the plants may be plowed both ways, or in directions at right angles to each other.

To the back part of the frame A there is attached a bar, S, having a strip, T, secured at right angles to its outer end. This device is a marker which may be turned to either side of the machine to mark the ground and serve as a gage to insure the seed being planted in rows at equal distances apart. This marker however, is an old and well-known device.

Having thus described my invention, what I claim as new, and desire to secure by Letters Patent, is—

The sliding or adjustable crank-shaft I, connected with the bar G of the slides F F by means of the pitmen H H, in combination with the bar J, provided with the beveled projection *d*, the shaft K, lever M, and cranks *h h*, connected with the furrow-openers O, all being arranged to operate substantially in the manner as and for the purpose herein set forth.

JOHN AGNEW.

Witnesses:
WILLIAM CRAIG,
ALLAN R. SCHOLL.